(12) United States Patent
Hawkins et al.

(10) Patent No.: US 6,273,034 B1
(45) Date of Patent: Aug. 14, 2001

(54) CLOSED LOOP FAN CONTROL USING FAN MOTOR PRESSURE FEEDBACK

(75) Inventors: Jeffery Scott Hawkins; Steve Miller Weisman, both of Farmington Hills, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/572,190

(22) Filed: May 17, 2000

(51) Int. Cl.$^7$ .......................................................... F01P 7/02
(52) U.S. Cl. .......................................................... 123/41.11
(58) Field of Search .............................. 123/41.11, 41.12; 60/445, 452

(56) References Cited

U.S. PATENT DOCUMENTS

| | | |
|---|---|---|
| 3,942,486 | 3/1976 | Kirchner . |
| 4,062,329 | 12/1977 | Rio . |
| 4,774,910 | 10/1988 | Aihara et al. . |
| 4,823,744 * | 4/1989 | Omura ................................ 123/41.12 |
| 4,874,072 | 10/1989 | Mohan et al. . |
| 4,913,102 | 4/1990 | Ohmura et al. . |
| 5,133,302 | 7/1992 | Yamada et al. . |
| 5,165,377 * | 11/1992 | Hosseini ............................. 123/41.12 |
| 5,307,644 * | 5/1994 | Cummins et al. .................... 62/133 |
| 5,483,927 * | 1/1996 | Letang et al. ..................... 123/41.12 |
| 5,531,190 | 7/1996 | Mork . |
| 5,667,045 | 9/1997 | Cummings, III . |
| 5,937,979 | 8/1999 | Cummings . |
| 5,947,247 | 9/1999 | Cummings, III . |

* cited by examiner

Primary Examiner—Tony M. Argenbright
Assistant Examiner—Katrina B. Harris
(74) Attorney, Agent, or Firm—Brooks & Kushman P.C.

(57) ABSTRACT

A method of controlling an internal combustion engine having a variable speed fan includes controlling the variable speed fan with closed loop control based on fan motor hydraulic pressure. A reference fan pressure is based on an applied fan request signal. The actual fan motor pressure is monitored, and an error signal is determined by comparing the reference fan pressure to the actual fan pressure. The fan is driven based on the error signal.

12 Claims, 2 Drawing Sheets

CLOSED LOOP FAN CONTROL USING FAN MOTOR PRESSURE FEEDBACK

TECHNICAL FIELD

The present invention relates to a method of controlling an internal combustion engine including a variable speed fan.

BACKGROUND ART

In the control of heavy duty internal combustion engines, the conventional practice utilizes electronic control units having volatile and non-volatile memory, input and output driver circuitry, and a processor that executes instructions to control the engine and its various systems and sub-systems. A particular electronic control unit communicates with numerous sensors, actuators, and other electronic control units to control various functions, which may include various aspects of field delivery, transmission control, and many others. When the engine includes a variable speed fan, the electronic control unit operates the fan in accordance with received fan request signals. Typically, although variable speed fans have been used with internal combustion engines, the control schemes utilized to control the variable speed fans have been simple and quite conservative to reduce the possibility of accidental overheating and engine component failure.

However, the heavy duty engine business is extremely competitive. Increased demands are being placed on engine manufacturers to design and build engines that provide better engine performance, improved reliability, and greater durability while meeting more stringent emission and noise requirements. Along with all of these, perhaps the greatest customer demand is to provide engines that are more fuel efficient. Demands for fuel efficiency are becoming so great, that all engine driven systems in the vehicle are being scrutinized in attempts to reduce power consumption when possible.

For the foregoing reasons, there is a need for an improved method of controlling an internal combustion engine including a variable speed fan in which the variable speed fan is aggressively controlled to improve vehicle fuel efficiency.

DISCLOSURE OF INVENTION

It is, therefore, an object of the present invention to provide a method of controlling an internal combustion engine with a variable speed fan wherein a hydraulic pump drives a hydraulic fan motor via a closed loop control system based on a hydraulic oil pressure error signal for the fan motor.

In carrying out the above object and other objects and features of the present invention, a method of controlling an internal combustion engine is provided. The engine includes a hydraulically driven variable speed fan wherein hydraulic oil is pumped by a pump to drive a hydraulic fan motor. The variable speed fan is driven in response to an applied fan request signal having a value between a predetermined maximum fan request value and a predetermined minimum fan request value. The engine is operable over engine speed range between an idle speed and a full speed. The method comprises determining the applied fan request signal value based on at least one engine operating condition, determining a reference hydraulic oil pressure for the fan motor based on the applied fan request signal, and monitoring an actual hydraulic oil pressure for the fan motor. The method further comprises determining an error signal by comparing the reference pressure to the actual pressure, and driving the fan motor based on the error signal such that the actual pressure tracks the reference pressure.

In a preferred embodiment, determining the actual fan request signal further comprises determining a plurality of preliminary initial fan request signals. Each request signal has a value based on at least one engine condition and between the minimum fan request value and the maximum fan request value. Further, the applied fan request signal is determined as the preliminary fan request signal having the greatest value. In a preferred embodiment, driving the fan motor further comprises driving the fan motor based on the error signal, a proportional term, and an integral term such that the actual fan motor pressure tracks to the reference fan pressure.

Still further, in a preferred embodiment, the method further comprises determining a steady state error based on the error signal, establishing an acceptable error range, and generating a diagnostic signal indicative of a fan failure mode when the steady state error falls outside of the acceptable error range. The acceptable error range represents acceptable steady state error for the fan motor pressure during normal fan operation.

Even further, in a preferred embodiment, establishing the acceptable error range further comprises establishing a positive error limit, and establishing a negative error limit. A fan over speed failure mode occurs when the steady state error falls below the negative error limit, and a fan under speed failure mode occurs when the steady state error exceeds the positive error limit. Preferably, an alert signal is generated to alert a vehicle operator of the fan failure mode, when present.

Further, in carrying out the present invention, computer readable storage medium having instructions stored thereon that are executable by a controller to perform a method of controlling an internal combustion engine is provided. The engine includes a hydraulically driven variable speed fan wherein hydraulic oil is pumped by a pump to drive a hydraulic fan motor. The variable speed fan is driven in response to an applied fan request signal having a value between a predetermined maximum fan request value and a predetermined minimum fan request value. The engine is operable over an engine speed range between an idle speed and a full speed.

The medium further comprises instructions for determining the applied fan request signal value based on at least one engine operating condition, instructions for determining a reference hydraulic oil pressure for the fan motor based on the applied fan request signal, and instructions for monitoring an actual hydraulic oil pressure for the fan motor. The medium further comprises instructions for determining an error signal by comparing the reference pressure to the actual pressure, and instructions for driving the fan motor based on the error signal such that the actual pressure tracks the reference pressure.

The advantages associated with embodiments of the present invention are numerous. For example, embodiments of the present invention, for the very first time, control a variable speed hydraulically driven engine fan with a closed loop system, wherein the closed loop control is based on hydraulic oil pressure present at the input to the fan motor. Further, preferred embodiments of the invention provide enhanced diagnostic capabilities.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
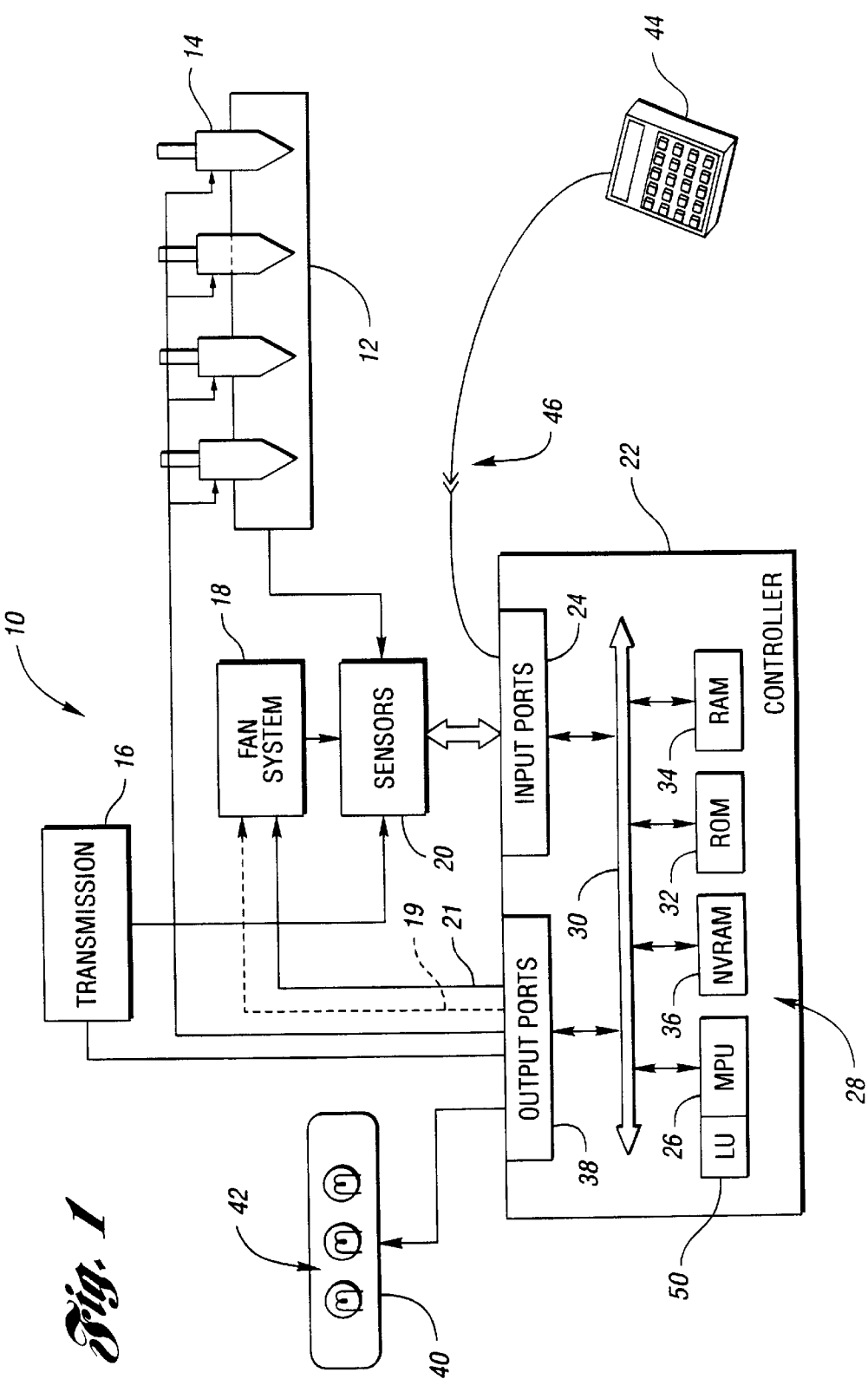
FIG. 1 is a schematic diagram of an internal combustion engine and engine control system made in accordance with the present invention.

With reference to FIG. 1, an internal combustion engine and associated control systems and subsystems are generally indicated at 10. System 10 includes an engine 12 having a plurality of cylinders, each fed by fuel injectors 14. In a preferred embodiment, engine 12 is a compression-ignition internal combustion engine, such as a heavy duty diesel fuel engine. Injectors 14 receive pressurized fuel from a fuel supply in a known manner.

System 10 also includes a vehicle transmission 16 and a fan system 18. Fan system 18, and the various embodiments of the present invention, may suitably be implemented as an electrically driven fan system, a hydraulically driven fan system, or a direct drive system with a variable fan clutch. It is appreciated that some embodiments of the present invention are most suited for hydraulically driven fan system, but some embodiments may be used alternatively with other types of fan systems. Sensors 20 are in electrical communication with a controller 22 via input ports 24. Controller 22 preferably includes a microprocessor 26 in communication with various computer readable storage media 28 via data and control bus 30. Computer readable storage media 28 may include any of a number of known devices which function as read only memory 32, random access memory 34, and non-volatile random access memory 36.

Computer readable storage media 28 have instructions stored thereon that are executable by controller 22 to perform methods of controlling the internal combustion engine, including variable speed fan system 18. The program instructions direct controller 22 to control the various systems and subsystems of the vehicle, with the instructions being executed by microprocessor 26, and optionally, instructions may also be executed by any number of logic units 50. Input ports 24 receive signals from sensors 20, and controller 22 generates signals at output ports 38 that are directed to the various vehicle components. The signals may be provided to a display device 40 which includes various indicators such as lights 42 to communicate information relative to system operation to the operator of the vehicle.

A data, diagnostics, and programming interface 44 may also be selectively connected to controller 22 via a plug 46 to exchange various information therebetween. Interface 44 may be used to change values within the computer readable storage media 28, such as configuration settings, calibration variables, temperature thresholds for variable speed, fan speed, and others.

In operation, controller 22 receives signals from sensors 20 and executes control logic embedded in hardware and/or software to control the engine, including controlling variable speed fan system 18. In a preferred embodiment, controller 22 is the DDEC controller available from Detroit Diesel Corporation, Detroit, Mich. Various other features of this controller are described in detail in a number of different U.S. patents assigned to Detroit Diesel Corporation. In particular, fan system 18 is controlled by an applied fan request signal 21 that commands the fan system. The applied fan request signal is generated by controller 22 based on any number of different factors such as various temperatures at different parts of the engine. Further, in accordance with the present invention, controller 22 processes a plurality of initial fan request signals using various techniques of the present invention to arrive at the final applied fan request signal that is sent to fan system 18. Further, in some implementations, additional information may also be supplied to fan system 18 as indicated by dashed line 19. The additional information such as, for example, an engine compartment temperature at a predetermined engine compartment hot spot, may be provided to fan system 18, such that fan system 18 may modify fan operation without strictly controlling the fan in accordance with the applied fan request 21. For example, fan system 18 may effect special control of the fan system, for example, during a cold engine start up as determined by a temperature at input 19.

As is appreciated by one of ordinary skill in the art, control logic may be implemented in hardware, firmware, software, or combinations thereof. Further, control logic may be executed by controller 22, in addition to by any of the various systems and subsystems of the vehicle cooperating with controller 22. Further, although in a preferred embodiment, controller 22 includes microprocessor 26, any of a number of known programming and processing techniques or strategy may be used to control an engine in accordance with the present invention.

Further, it is to be appreciated that the engine controller may receive information in a variety of ways. For example, transmission information could be received over a data link, at a digital input or at a sensor input of the engine controller. Continuing with the transmission information example, transmission parameters such as transmission oil sump temperature, transmission retarder status, etc., may be received over a digital communication data link. The data link could be in accordance with a Society of Automotive Engineers (SAE) protocol, such as SAE J1587 or SAE J1939.

When a digital input to the engine controller is used to receive information, a single wire could be hard wired to the engine controller digital input, from the transmission. The digital input could then be left open (high) or pulled to ground to indicate information such as transmission retarder status as active or inactive, respectively. In another digital input example, a temperature switch could be hard wired to the digital impact such that open indicates a temperature above a threshold while closed (pulled to ground) indicates a normal temperature (below the threshold).

And further, in the example, a sensor such as a sensor with an analog output could be wired to a sensor input of the engine controller. Further, it is appreciated that transmission information is an example, and the above techniques and others may be employed to provide other types of information to the engine controller.

Figure 2:
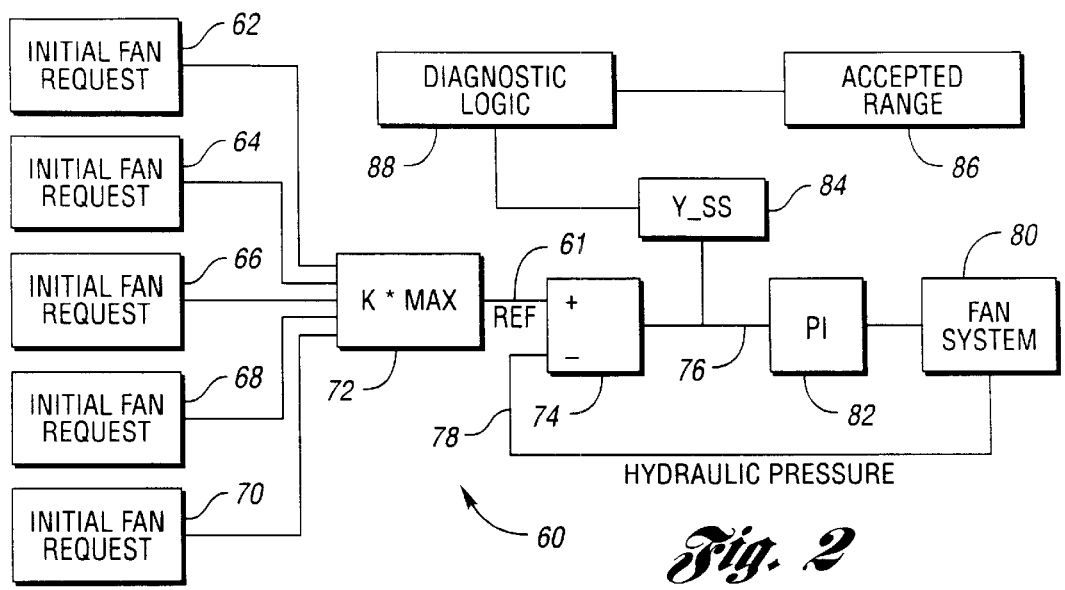
FIG. 2 is a block diagram illustrating a feedback control system, based on fan speed, of the present invention.

With reference to FIG. 2, a block diagram illustrating a feedback control system for controlling a variable speed fan in an internal combustion engine is generally indicated at 60. Embodiments of the present invention are well-suited for compression-ignition type engines including a hydraulically driven fan wherein hydraulic oil is pumped by an engine driven pump to drive a hydraulic fan motor. Generally, the requested fan pressure or reference fan pressure 61 is determined by the engine controller and passed to the fan system. In determining reference fan pressure 61, the engine controller received a plurality of preliminary initial fan requests 62, 64, 66, 68, and 70. As used herein, fan pressure means hydraulic oil pressure at the fan motor. Each preliminary initial fan request has a value based on at least one engine operating condition with the value falling between a minimum fan request value and a maximum fan request value. For example, a fan request may be based on engine air inlet temperature, while another fan request is based on engine coolant temperature, and still another fan request is based on engine oil temperature. Further, for example, there may be a fan request based on transmission retarder status, in addition to another fan request based on a manual request by the operator, and still another request based on an engine controller input received from the air conditioning freon compressor. And even further, there may be a fan request based on transmission oil temperature. That is, many different systems and subsystems of the vehicle may generate fan requests. At block 72, the applied fan request signal is the preliminary fan request signal having the greatest value. By selecting the applied fan request as the largest preliminary initial fan request, adequate cooling will be provided to all systems and subsystems requesting cooling. Reference fan pressure 61 is determined by multiplying the applied fan request signal by a reference value to result in a fan pressure. That is, the fan request need not be actual fan motor hydraulic pressures. Reference fan pressure 61 is passed to a summer 74 for comparison to the current, or actual, fan motor hydraulic pressure 78. The output of summer 74 is a fan pressure error signal 76. Control terms at block 82 are convolved with error signal input 76 to provide proportional and integral control of fan system 80. Proportional/integral control terms 82 are tuned such that the actual fan pressure 78 tracks the reference fan pressure 61. At block 84, system control logic determines a steady state error based on the error signal.

Control logic block 86 establishes an acceptable error range representing acceptable steady state error for the fan motor pressure during normal fan operation. Diagnostic logic 88 processes signals received from steady state logic 84 and acceptable range logic 86 to generate a diagnostic signal indicative of a fan failure mode when the steady state error falls outside of the acceptable error range.

In the preferred embodiment, a fan over speed failure mode occurs when the steady state error falls below a negative error limit, and a fan under speed failure mode occurs when the steady state error exceeds a positive error limit. It is appreciated that the different signals in FIG. 2 may take many forms. For example, the driving signal for fan system 80 may be a pulse width modulated signal wherein the duty cycle is varied to drive the fan. Further, for example, the preliminary fan request signals 62, 64, 66, 68, and 70 may be determined as the difference between an actual temperature and a reference temperature, multiplied by a constant. On the other hand, some of the preliminary fan requests may be based on things other than temperature, such as pressures, etc.

In a suitable implementation, fan system 80 is a hydraulically driven fan system wherein hydraulic oil is pumped by a pump to drive a hydraulic fan motor. The fan motor may be driven with a pulse width modulated drive signal that acts on a hydraulic valve between the pump and the fan motor, selectively opening and closing a bypass to affect a variable drive to the fan motor.

Figure 3:
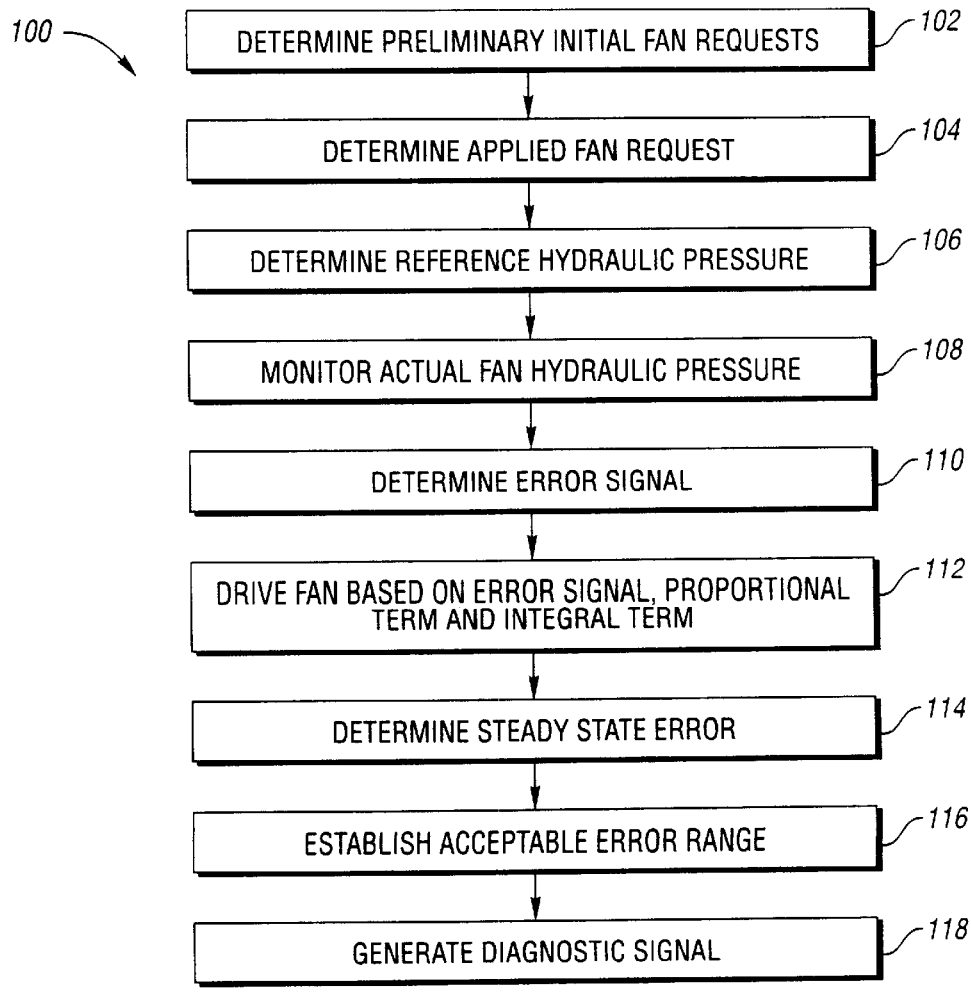
FIG. 3 is a block diagram illustrating a method of the present invention.

In FIG. 3, a method of the present invention is generally indicated at 100. At block 102, preliminary initial fan requests are determined. At block 104, an applied fan request is determined based on the preliminary initial fan request. For example, the applied fan request may be the preliminary initial fan request having the greatest value. At block 106, a reference fan motor pressure is determined based on the applied fan request. That is, the fan request signals may need to be, for example, multiplied by a multiplier to produce a fan pressure.

At block 108, actual fan motor hydraulic oil pressure is monitored. At block 110, an error signal is determined by comparing the reference fan pressure to the actual fan pressure. At block 112, the fan system is driven based on an error signal, a proportional term, and an integral term. That is, the error signal produced by comparing the reference and actual signals is convolved with proportional and integral terms to provide a drive signal for the fan system.

At block 114, steady state error is determined. At block 116, acceptable error range for the steady state error is established. At block 118, a diagnostic signal is generated based on the steady state error and the acceptable error range. That is, embodiments of the present invention monitor the steady state fan motor hydraulic oil pressure error to detect fan failure modes. For example, the fan over speed failure mode occurs when the fan operates continuously at higher pressures (implying higher speeds) than the requested (reference) pressure, resulting in reduced fuel economy and reduced engine durability. On the other hand, a fan under speed value occurs when the fan stops or operates at reduced pressures for a period of time. That is, when there is a significant reduction in actual fan pressure without a similar reduction in requested fan pressure, a major under speed fan failure is determined.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling an internal combustion engine, the engine including a hydraulically driven variable speed fan wherein hydraulic oil is pumped by a pump to drive a hydraulic fan motor, the variable speed fan being driven in response to an applied fan request signal having a value between a predetermined maximum fan request value and a predetermined minimum fan request value, the engine being operable over an engine speed range between an idle speed and a full speed, the method comprising:

determining the applied fan request signal value based on at least one engine operating condition;

determining a reference hydraulic oil pressure for the fan motor based on the applied fan request signal;

monitoring an actual hydraulic oil pressure for the fan motor;

determining an error signal by comparing the reference pressure to the actual pressure; and driving the fan motor based on the error signal such that the actual pressure tracks the reference pressure.

2. The method of claim 1 wherein determining the applied fan request signal further comprises:

determining a plurality of preliminary initial fan request signals, each request signal having a value based on at least one engine condition and between the minimum fan request value and the maximum fan request value; and determining the applied fan request signal as the preliminary fan request signal having the greatest value.

3. The method of claim 1 wherein driving the fan motor further comprises:

driving the fan based on the error signal, a proportional term and an integral term such that the actual fan speed tracks the reference fan speed.

4. The method of claim 3 further comprising:

determining a steady state error based on the error signal;

establishing an acceptable error range representing acceptable steady state error for the fan during normal fan operation; and generating a diagnostic signal indicative of a fan failure mode when the steady state error falls outside of the acceptable error range.

5. The method of claim 4 wherein establishing the acceptable error range further comprises:

establishing a negative error limit wherein a fan overspeed failure mode occurs when the steady state error falls below the negative error limit; and establishing a positive error limit wherein a fan underspeed failure mode occurs when the steady state error exceeds the positive error limit.

6. The method of claim 4 further comprising:

generating an alert signal to alert a vehicle operator of the fan failure mode, when present.

7. A computer readable storage medium having instructions stored thereon that are executable by a controller to perform a method of controlling an internal combustion engine, the engine including a hydraulically driven variable speed fan wherein hydraulic oil is pumped by a pump to drive a hydraulic fan motor, the variable speed fan being driven in response to an applied fan request signal having a value between a predetermined maximum fan request value and a predetermined minimum fan request value, the engine being operable over an engine speed range between an idle speed and a full speed, the medium further comprising:

instructions for determining the applied fan request signal value based on at least one engine operating condition;

instructions for determining a reference hydraulic oil pressure for the fan motor based on the applied fan request signal;

instructions for monitoring an actual hydraulic oil pressure for the fan motor;

instructions for determining an error signal by comparing the reference pressure to the actual pressure; and instructions for driving the fan motor based on the error signal such that the actual pressure tracks the reference pressure.

8. The medium of claim 7 wherein the instructions for determining the applied fan request signal further comprise:

instructions for determining a plurality of preliminary initial fan request signals, each request signal having a value based on at least one engine condition and between the minimum fan request value and the maximum fan request value; and instructions for determining the applied fan request signal as the preliminary fan request signal having the greatest value.

9. The medium of claim 7 wherein the instructions for driving the fan motor further comprise:

instructions for driving the fan based on the error signal, a proportional term and an integral term such that the actual fan speed tracks the reference fan speed.

10. The medium of claim 9 further comprising:

instructions for determining a steady state error based on the error signal;

instructions for establishing an acceptable error range representing acceptable steady state error for the fan during normal fan operation; and instructions for generating a diagnostic signal indicative of a fan failure mode when the steady state error falls outside of the acceptable error range.

11. The medium of claim 10 wherein the instructions for establishing the acceptable error range further comprise:

instructions for establishing a negative error limit wherein a fan overspeed failure mode occurs when the steady state error falls below the negative error limit; and instructions for establishing a positive error limit wherein a fan underspeed failure mode occurs when the steady state error exceeds the positive error limit.

12. The medium of claim 10 further comprising:

instructions for generating an alert signal to alert a vehicle operator of the fan failure mode, when present.

\* \* \* \* \*